(12) United States Patent
Robertson et al.

(10) Patent No.: US 10,662,774 B2
(45) Date of Patent: May 26, 2020

(54) PRIME MOVER ASSEMBLY HAVING FIXED CENTER MEMBER BETWEEN ROTATING MEMBERS

(71) Applicant: REGI U.S., INC., Spokane, WA (US)

(72) Inventors: John Robertson, Richmond (CA); Paul Porter, Colbert, WA (US)

(73) Assignee: Regi U.S., Inc., Spokane, WA (US)

( * ) Notice: Subject to any disclaimer, the term of this patent is extended or adjusted under 35 U.S.C. 154(b) by 334 days.

(21) Appl. No.: 15/669,625

(22) Filed: Aug. 4, 2017

(65) Prior Publication Data

US 2018/0073364 A1   Mar. 15, 2018

Related U.S. Application Data

(60) Provisional application No. 62/394,067, filed on Sep. 13, 2016.

(51) Int. Cl.
| | |
|---|---|
| *F01C 1/344* | (2006.01) |
| *F01C 21/10* | (2006.01) |
| *F01C 21/18* | (2006.01) |
| *F04C 18/344* | (2006.01) |
| *F04C 2/344* | (2006.01) |
| *F02B 53/10* | (2006.01) |
| *F02B 53/04* | (2006.01) |
| *F02B 55/08* | (2006.01) |

(52) U.S. Cl.
CPC .......... *F01C 1/3448* (2013.01); *F01C 21/108* (2013.01); *F01C 21/18* (2013.01); *F02B 53/04* (2013.01); *F02B 53/10* (2013.01); *F02B 55/08* (2013.01); *F04C 2/3448* (2013.01); *F04C 18/3448* (2013.01); *Y02T 10/17* (2013.01)

(58) Field of Classification Search
CPC .................................................. F01C 1/3448
See application file for complete search history.

(56) References Cited

U.S. PATENT DOCUMENTS

| | | | | |
|---|---|---|---|---|
| 2,070,606 | A | * | 2/1937 | Lickfeldt ............. F01C 1/3448 123/235 |
| 4,170,213 | A | * | 10/1979 | Williams ............. F01C 1/3448 123/222 |
| 4,293,777 | A | | 10/1981 | Gamell |
| 5,509,793 | A | | 4/1996 | Cherry et al. |

(Continued)

OTHER PUBLICATIONS

Office action for U.S. Appl. No. 15/669,589, dated Jan. 7, 2019, Robertson, "Electricity Generator and Methods for Generating Electricity", 10 pages.

*Primary Examiner* — Mary Davis
(74) *Attorney, Agent, or Firm* — Lee & Hayes, P.C.

(57) ABSTRACT

Prime movers are provided that can include: a pair of cylindrical members about a center rod, a fixed member about the center rod between the pair of cylindrical members; wherein the pair of cylindrical members rotate with the center rod in relation to the fixed member; a housing extending between the cylindrical members; and a plurality of chambers between the opposing bases of the cylindrical members and the fixed member. Methods for rotating members in relation to a fixed member are also provided. The methods can include rotating a pair of cylindrical members in relation to a fixed member about a center rod along a shared axis within a housing extending between the pair of cylindrical members.

19 Claims, 8 Drawing Sheets

(56) References Cited

U.S. PATENT DOCUMENTS

| | | | |
|---|---|---|---|
| 5,794,583 A * | 8/1998 | Ichieda | F01C 1/3448 |
| | | | 123/244 |
| 5,865,152 A * | 2/1999 | Murphy | F01C 1/3448 |
| | | | 123/237 |
| 6,222,331 B1 | 4/2001 | Blum | |
| 10,418,880 B2 * | 9/2019 | Robertson | F01C 1/3448 |
| 2009/0045687 A1 | 2/2009 | Yu et al. | |
| 2015/0115781 A1 | 4/2015 | Luparello | |
| 2018/0076690 A1 | 3/2018 | Robertson et al. | |

* cited by examiner

10,662,774 B2

PRIME MOVER ASSEMBLY HAVING FIXED CENTER MEMBER BETWEEN ROTATING MEMBERS

CROSS REFERENCE TO RELATED APPLICATION

This application claims priority to U.S. provisional patent application Ser. No. 62/394,067 filed Sep. 13, 2016, entitled "Rotary Engine With An Integrated Generator", the entirety of which is incorporated by reference herein.

TECHNICAL FIELD

The present invention relates to prime movers and in some implementations to a rotary engine and, in particular, to a rotary engine with a rotating housing.

BACKGROUND

U.S. Pat. No. 5,509,793 which issued on Apr. 23, 1996 to Cherry et al. discloses an example rotary engine that includes a pair of fixed cams about a central rotor. The entirety of this patent is incorporated by reference herein.

SUMMARY OF THE DISCLOSURE

Prime movers are provided that can include: a pair of cylindrical members about a center rod aligned along a central axis of the cylindrical members, each of the cylindrical members defining first outer sidewalls and first opposing bases, one of the first opposing bases of one member opposing one of the first opposing bases of the other member, a fixed member about the center rod between the pair of cylindrical members aligned along the axis of the fixed member, the fixed member defining second outer sidewalls and second opposing bases; wherein the pair of cylindrical members rotate with the center rod in relation to the fixed member; a housing extending between the cylindrical members; and a plurality of chambers between the opposing bases of the cylindrical members and the fixed member.

Methods for rotating members in relation to a fixed member are also provided. The methods can include rotating a pair of cylindrical members in relation to a fixed member about a center rod along a shared axis within a housing extending between the pair of cylindrical members.

DRAWINGS

Embodiments of the disclosure are described below with reference to the following accompanying drawings.

DESCRIPTION

This disclosure is submitted in furtherance of the constitutional purposes of the U.S. Patent Laws "to promote the progress of science and useful arts" (Article 1, Section 8).

The inventors have recognized that the prior art held the cams and housing stationary and the rotor and vanes rotated within the housing. At least one benefit of some of the embodiments of the present disclosure is the reduction of centripetal forces which act on the vanes of prior art rotary engines. When the vanes rotate, centripetal forces can push the vanes outward with increasing force as RPM increases. These forces can cause the vanes to apply more pressure on the outside diameter seals and less force on the internal diameter seals. The forces become a limiting factor on the speed at which the device can rotate before friction and sealing forces are too large and will cause failure of the device.

The present disclosure provides prime mover assemblies for configuration as engines, pumps, compressors, and/or expanders.

There is accordingly disclosed a rotary engine that can include a housing about spaced-apart and opposing undulating rotating cam surfaces. A fixed member is also disposed within the housing between the undulating cam surfaces. The fixed member can have a plurality of slots extending axially therethrough. Within these slots can be a plurality of vanes and each one of the vanes is slidably received by a corresponding one of the slots in the member. The housing is affixed to and rotates with the two rotating cams.

There is further disclosed, a rotary compressor that includes a rotatable housing and cams. There is further disclosed, a rotary expander that includes a rotatable housing and cams. There is further disclosed, a rotary pump that includes a rotatable housing and cams.

Figure 1:
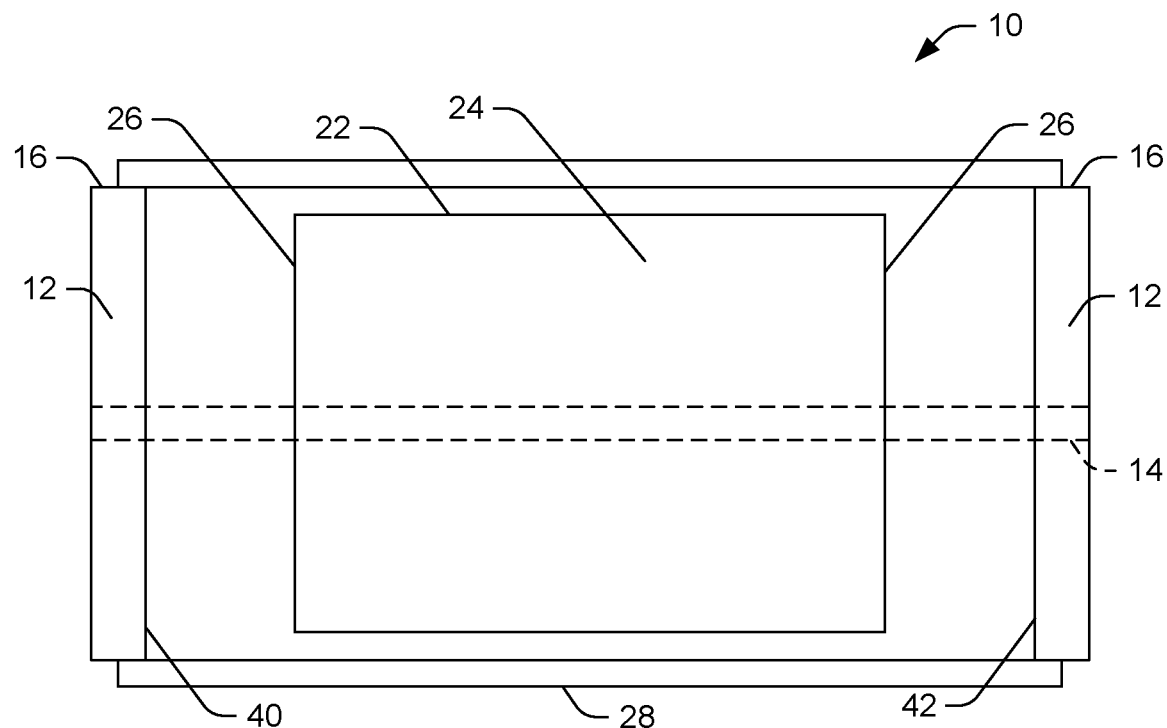
FIG. 1 is an elevational view of the general elements of a prime mover according an embodiment of the disclosure.

The present disclosure will be described with reference to FIGS. 1-7B. Referring first to FIG. 1 a prime mover assembly 10 is depicted that includes a pair of cylindrical members 12 about a center rod 14 aligned along a central axis of cylindrical members 12. Each of members 12 can include outer sidewalls 16 and undulating cam surfaces 40, 42. In accordance with example implementations, the undulating cam surface 40 can oppose the undulating cam surface 42 of the other cylindrical member 12.

Assembly 10 can also include a fixed member 22 about the center rod 14 and between cylindrical members 12. Member 22 can define outer sidewalls 24 and opposing bases 26. Fixed member 22 can be fixed in relation to rotation of cylindrical members 12.

Each of opposing bases 26 can oppose one of the undulating cam surfaces 40, 42 to provide and interface between the fixed member 22 and the cylindrical members 12. Within this interface can be chambers configured to receive fluid in some form and manipulate same. The fluid may be received as source energy and converted to mechanical energy, for example during combustion, or expansion. As another example, fluid may be received and compressed. And as another example, fluid may be simply transported as in a pump.

A housing 28 can be coupled to one or both of the cylindrical members 12 and configured to rotate about the fixed member 22. The prime mover assembly 10 of the present disclosure includes a rotating housing 28, which is rotatable about the fixed member 22. Mechanical force can be obtained from the mover in multiple ways, one of which includes affixing a member to one or both of the cylindrical members 12.

Additionally, while shown and referred to as cylindrical, the cylindrical members 12 need not be perfectly cylindrical. The cylindrical members 12 only need to be balanced sufficiently to rotate efficiently. Therefore, non-cylindrical but balanced members about the center rod 14 will meet the definition of cylindrical member.

Figure 2:
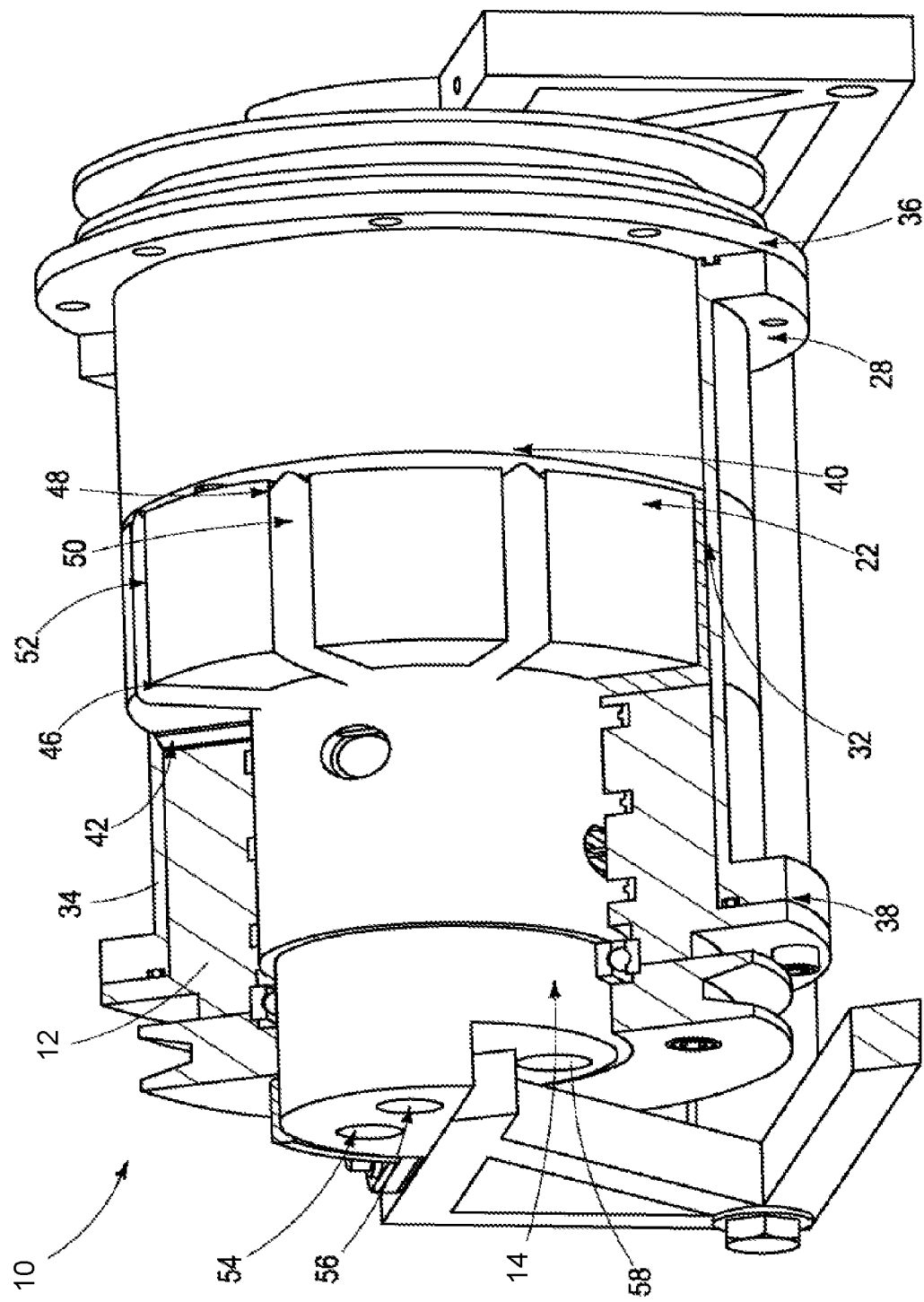
FIG. 2 is a perspective view of a prime mover according to an embodiment of the disclosure.

Referring next to FIG. 2, a prime mover assembly 10 configured as a rotary engine is depicted. Prime mover assembly 10 generally can include the housing 28 which can define a substantially cylindrical internal chamber 32 defined by an annular wall 34 extending between opposed end walls 36 and 38 of the cylindrical members 12, respectively. There are undulating, rotating cam surfaces 40 and 42 on respective cylindrical members 12, disposed within the internal chamber 32. There is also the fixed member 22 disposed within the internal chamber 32 between the undulating cam surface 40 and 42. Member 22 is mounted on the center rod 14. Member 22 can include a plurality of slots extending axially therethrough, for example slots 46 and 48, each of which receives a corresponding slidable vane, for example vanes 50 and 52, which reciprocate axially in a direction parallel to the center rod 14 when the cylindrical members 12 rotate. The prime mover assembly 10 can also include an air intake port 54, and an exhaust port 56 on each end wall thereof. The air intake port 54, and the exhaust port 56 are shown for one of the end walls 36 on one of the cylindrical members 12. It will however be understood by a person skilled in the art the other end wall has a substantially identical structure.

Figure 3A:
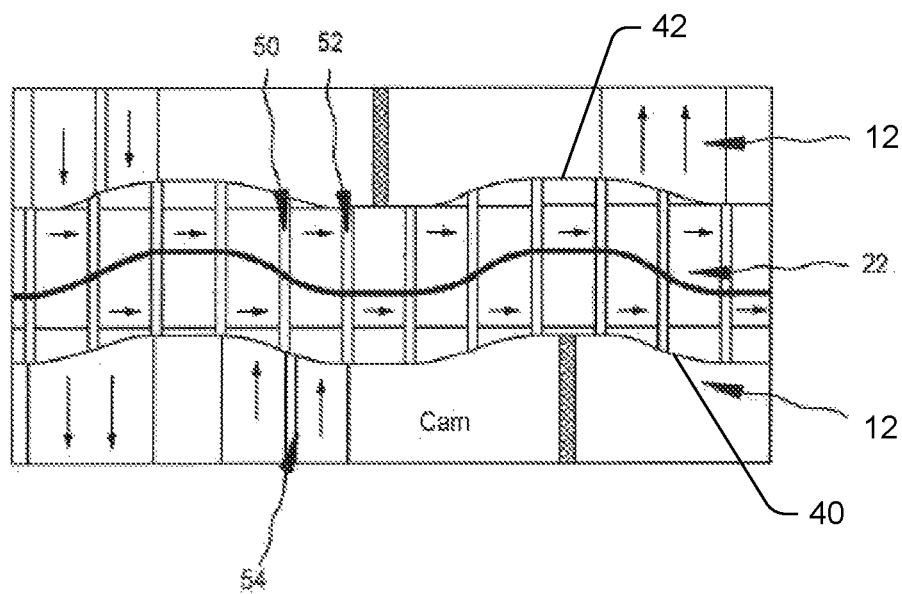
FIG. 3A is a schematic illustrating an intake stroke of the rotary engine of FIG. 2.
Figure 3B:
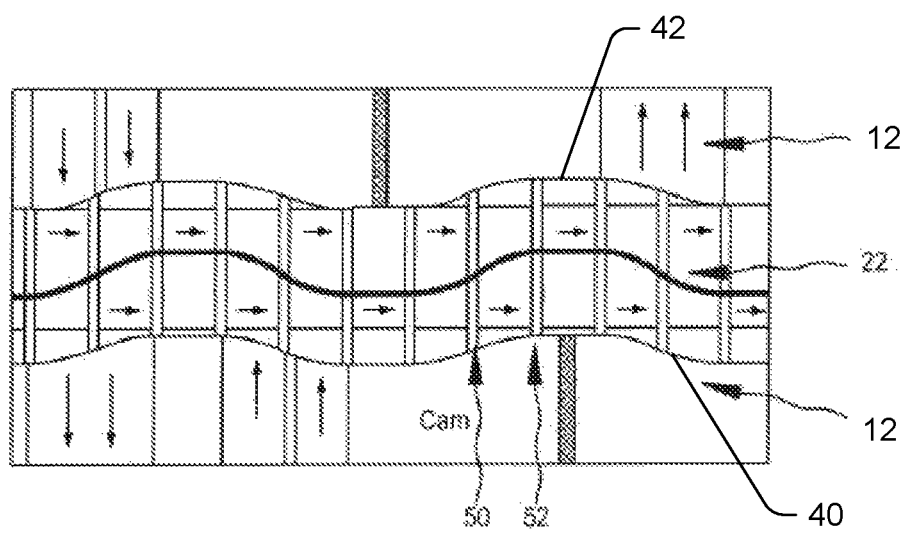
FIG. 3B is a schematic illustrating a compression stroke of the rotary engine of FIG. 2.
Figure 3C:
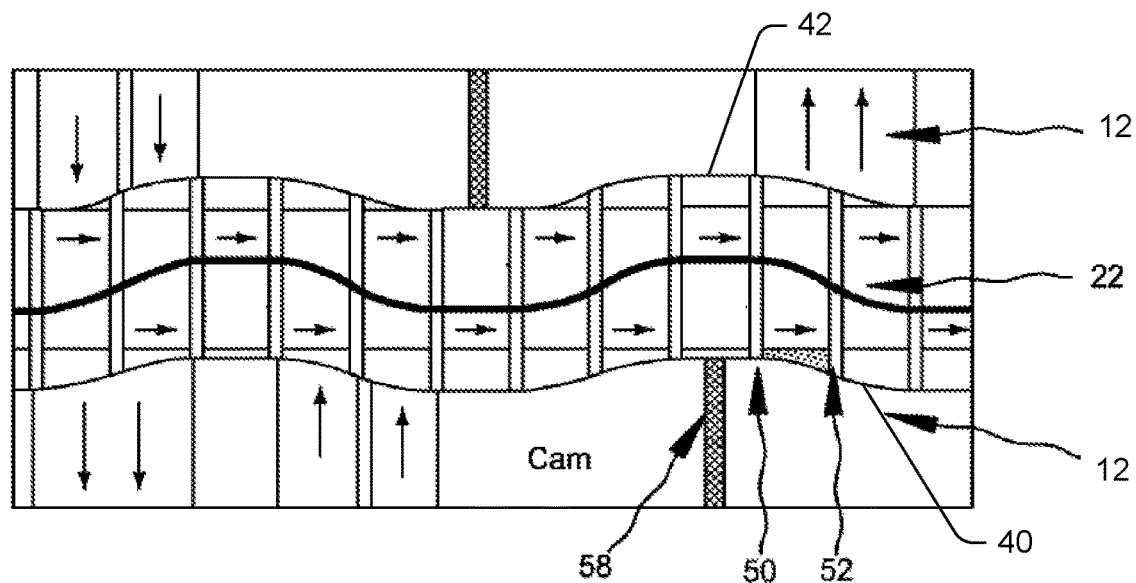
FIG. 3C is a schematic illustrating an expansion stroke of the rotary engine of FIG. 2.
Figure 3D:
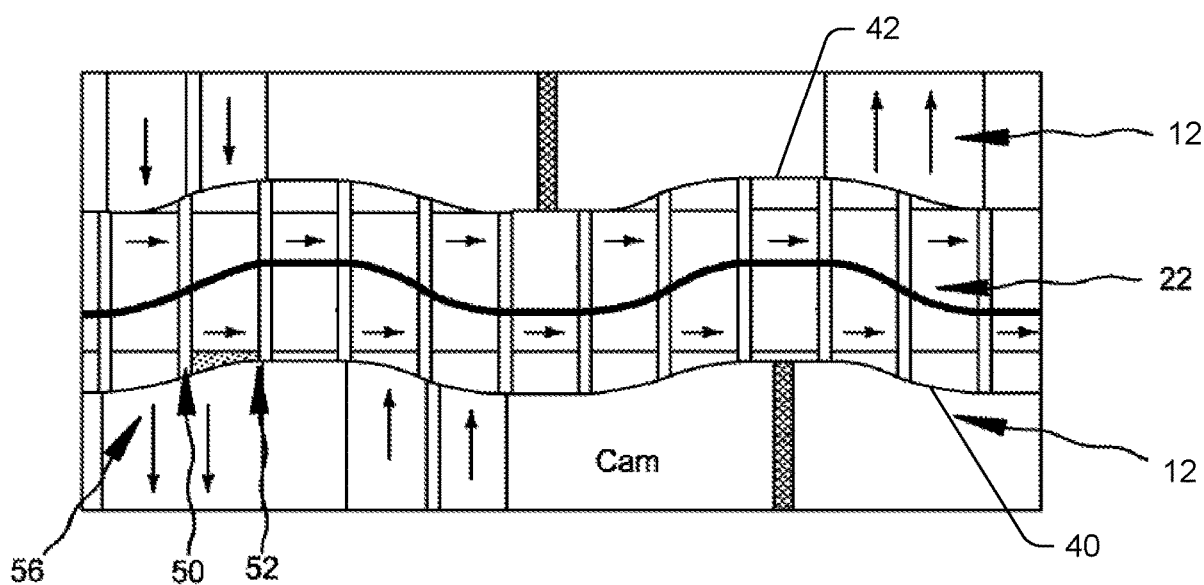
FIG. 3D is a schematic illustrating an exhaust stroke of the rotary engine of FIG. 2.

Air received through the air intake port 54 during a single rotation is trapped between adjacent vanes 50 and 52 and member 22 surface or cylindrical member 12 and cam surface 40, 42 as shown in FIG. 3A. The air is then compressed as the vanes rotate and move up the cam surface, the volume is constantly decreasing as the vanes approach the peak of the cam surface as shown in FIG. 3B. Fuel received though the fuel injection port 58 is ignited and expands during an expansion stroke due to an increasing volume between the adjacent vanes 50 and 52 the member 22 surface and cylindrical member 12 or cam surface 40, 42. As the vanes move down the cam surface to towards the lowest point on the cam surface 40, 42, as shown in FIG. 3C, expansion energy is converted to rotary motion. Exhaust gases are then forced out through the exhaust port 56 as the vanes pass over the port as shown in FIG. 3O. The rotary device is different as the cylindrical members 12 and housing 28 rotate whereas, the engine disclosed in U.S. Pat. No. 5,509,793 which issued on Apr. 23, 1996 to Cherry et al. which is incorporated herein by reference, has a stationary cam and housing with a rotor and rotating vanes.

Referring next to FIGS. 4A-7B, cylindrical members 12 are shown in conjunction with corresponding inlet outlet diagrams for various prime mover configurations.

Figure 4A:
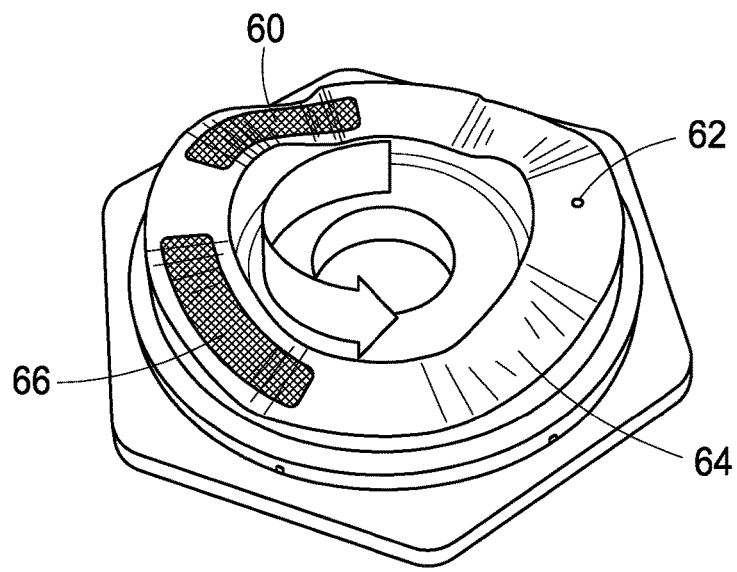
FIGS. 4A-4B is a depiction of a rotating member and associated inlet and discharge cycles in an engine configuration.
Figure 4B:
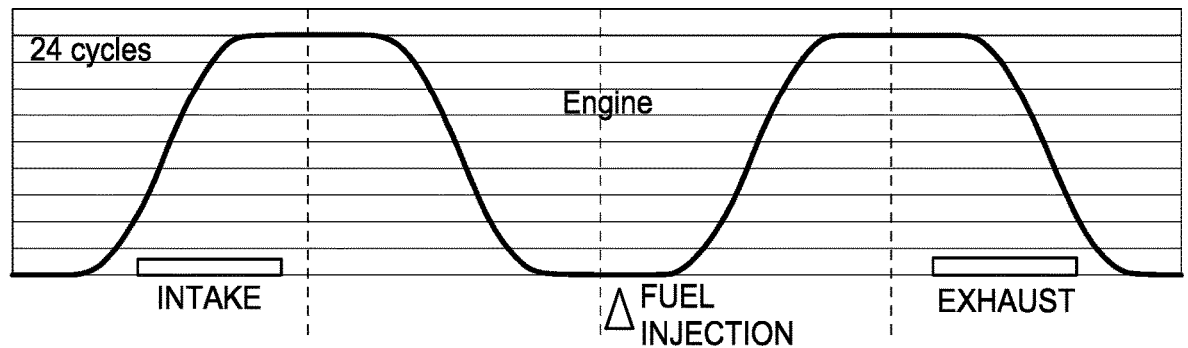

Referring to FIG. 4A-B, the prime mover is configured as an engine with cylindrical members 12 define chambers and ports as follows: exhaust port 60, fuel injection port 62, compression ramp 64, and intake port 66.

Figure 5A:
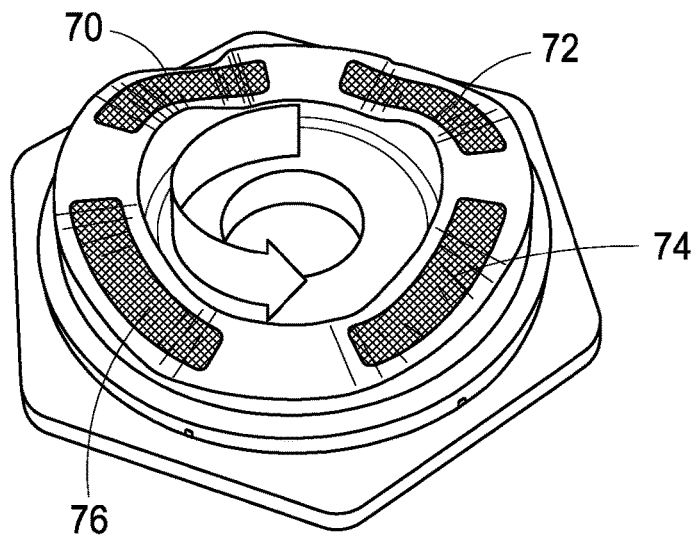
FIGS. 5A-5B is a depiction of a rotating member and associated inlet and discharge cycles in an pump configuration.
Figure 5B:
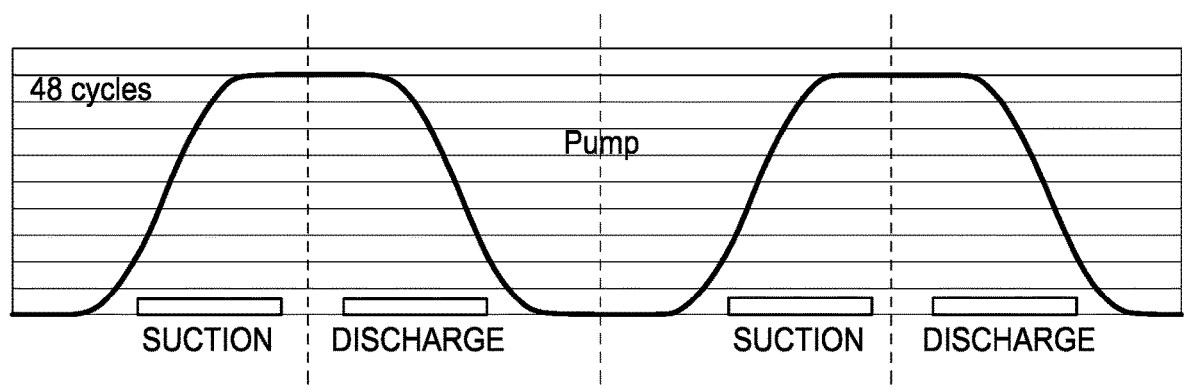

Referring to FIGS. 5A-5B, the prime mover is configured as a pump with discharge 70, suction 72, discharge 74, and suction 76.

Figure 6A:
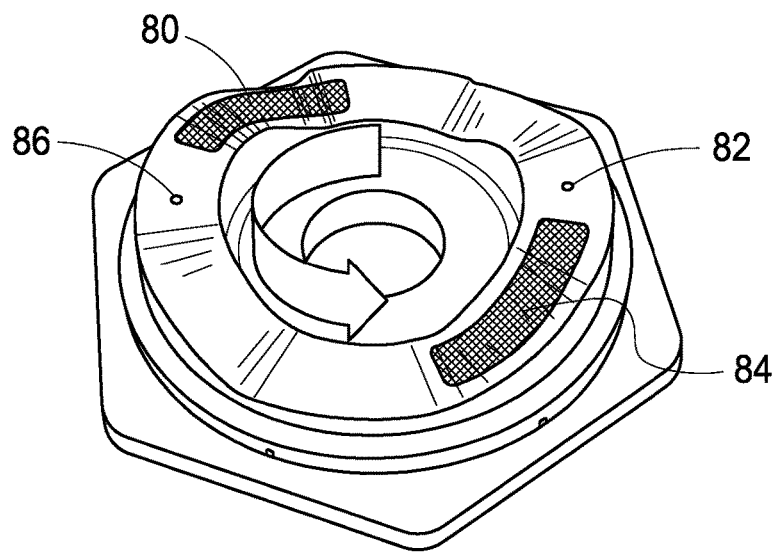
FIGS. 6A-6B is a depiction of a rotating member and associated inlet and discharge cycles in a compressor configuration.
Figure 6B:
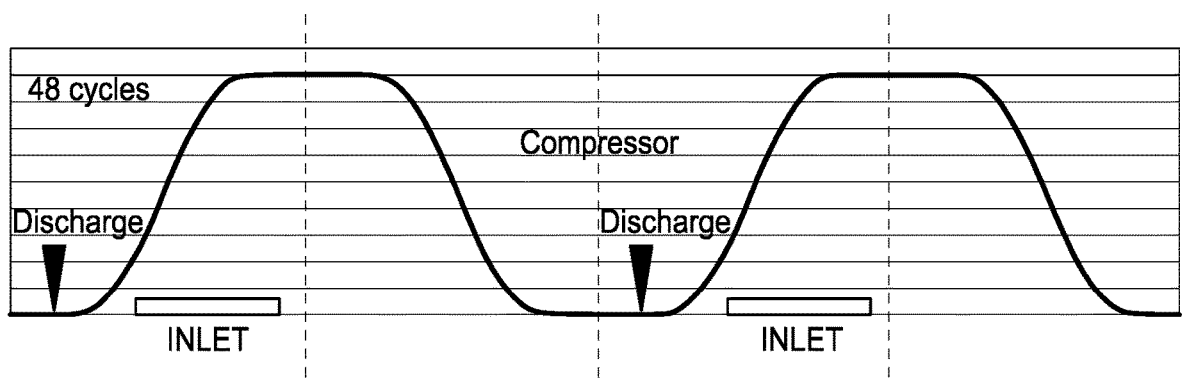

Referring to FIGS. 6A-6B, the prime mover is configured as a compressor with low pressure inlet 80, high pressure inlet 82, low pressure inlet 84, and high pressure discharge 86.

Figure 7A:
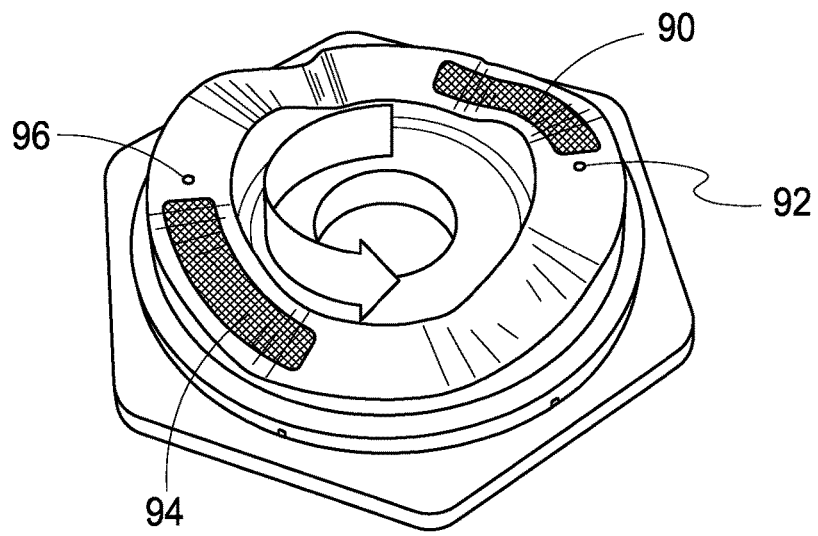
FIGS. 7A-7B is a depiction of a rotating member and associated inlet and discharge cycles in an expander configuration.
Figure 7B:
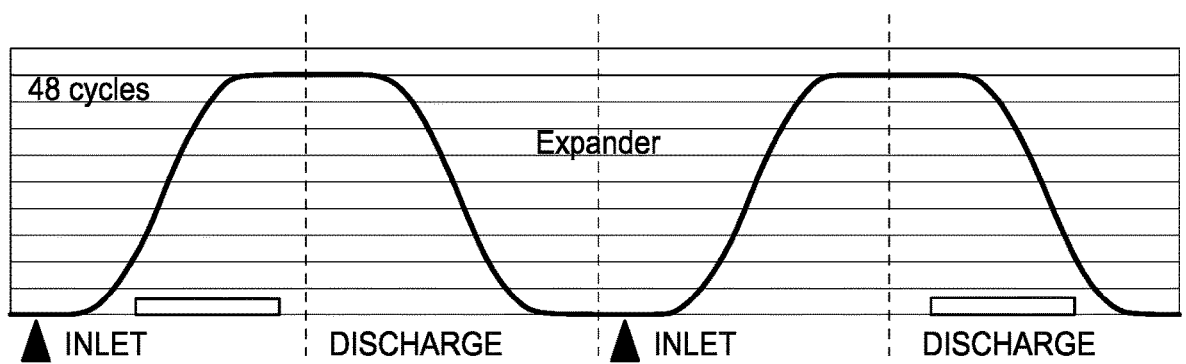

Referring to FIGS. 7A-7B, the prime mover is configured as an expander with low pressure discharge 90, high pressure inlet 92, low pressure discharge 94, and high pressure inlet 96.

In accordance with example implementations, mover can be configured to perform to distinct functions on either side of the fixed member. For example, one interface may perform pumping while the other interface performs combustion.

In compliance with the statute, embodiments of the invention have been described in language more or less specific as to structural and methodical features. It is to be understood, however, that the entire invention is not limited to the specific features and/or embodiments shown and/or described, since the disclosed embodiments comprise forms of putting the invention into effect. The invention is, therefore, claimed in any of its forms or modifications within the proper scope of the appended claims appropriately interpreted in accordance with the doctrine of equivalents.

The invention claimed is:

1. A prime mover comprising:
   a center rod;
   a first rotating member configured to rotate about the center rod, the first rotating member including a first cam surface and a first outer sidewall;
   a second rotating member configured to rotate about the center rod, the second rotating member including a second cam surface and a second outer sidewall, the second cam surface facing the first cam surface;
   a fixed member coupled to the center rod and interposed between the first rotating member and the second rotating member, the fixed member including:
   a first end having a first surface that faces the first cam surface; and
   a second end having a second surface that faces the second cam surface;
   a housing coupled to the first outer sidewall and the second outer sidewall, the housing disposed over the fixed member and configured to rotate about the center rod with the first rotating member and the second rotating member;
   a first plurality of chambers disposed between the first cam surface and the first surface; and
   a second plurality of chambers disposed between the second cam surface and the second surface.

2. The prime mover of claim 1, wherein the fixed member includes a plurality of slots extending through the fixed member, the prime mover further comprising a plurality of vanes slidably engaged within the fixed member within individual slots of the plurality of slots.

3. The prime mover of claim 2, wherein individual vanes of the plurality of the vanes include:
   a first end operably engaging the first cam surface; and
   a second end operably engaging the second cam surface.

4. The prime mover of claim 2, wherein the plurality of slots extend axially through the fixed member.

5. The prime mover of claim 2, wherein the plurality of vanes travel in a direction parallel to the center rod.

6. The prime mover of claim 1, further comprising at least one of:
a plurality of first ports extending through the first rotating member; or
a plurality of second ports extending through the second rotating member.

7. A method of operating a prime mover, the method comprising:
rotating a first member and a second member about a center rod in relation to a fixed member disposed between the first member and the second member, wherein the first member and the second member are coupled to a housing that encapsulates the fixed member and which is configured to rotate with the first member and the second member;
providing a first fluid to a plurality of first chambers located between a first cam surface of the first rotating member and a first surface of the fixed member; and
providing a second fluid to a plurality of second chamber located between a second cam surface of the second rotating member and a second surface of the fixed member.

8. The method of claim 7, further comprising at least one of:
providing the first fluid through a plurality of first ports within the fixed disposed through the first member; or
providing the second fluid through a plurality of second ports disposed through the second member.

9. The method of claim 7, further comprising at least one of: transporting the first fluid through first ports within the fixed disposed through the first member into the plurality of first chambers; or
transporting the second fluid through second ports disposed through the second member into the plurality of second chambers.

10. The method of claim 9, wherein the first fluid and the second fluid are pumped.

11. The method of claim 9, wherein the first fluid and the second fluid are compressed.

12. The method of claim 9, wherein:
the first member defines a first interface with the first surface of the fixed member; and
the second member defines a second interface with the second surface of the fixed member, the first interface for performing a physical function different than the second interface.

13. The method of claim 12, wherein the physical function includes compression, fluid transport, expansion, or combustion.

14. The method of claim 13, wherein the first interface is configured to perform compression and the second interface is configured to perform expansion.

15. The method of claim 7, wherein:
the fixed member includes a plurality of slots;
a plurality of vanes slidably engaged within the fixed member within individual slots of the plurality of slots;
adjacent chambers of the plurality of first chambers are separated by individual vanes of the plurality of vanes; and
adjacent chambers of the plurality of second chambers are separated by the individual vanes of the plurality of vanes.

16. An apparatus comprising:
a first rotating member including a first cam surface;
a second rotating member including a second cam surface that faces the first cam surface;
a fixed member interposed between the first rotating member and the second rotating member, the fixed member including:
a first surface that faces the first cam surface; and
a second surface that faces the second cam surface;
a housing coupled to the first rotating member and the second rotating member, the housing disposed over the fixed member and configured to rotate with the first rotating member and the second rotating member;
a first plurality of chambers disposed between the first cam surface and the first surface; and
a second plurality of chambers disposed between the second cam surface and the second surface.

17. The apparatus of claim 16, wherein:
the fixed member includes a plurality of slots;
a plurality of vanes slidably engaged within the fixed member within individual slots of the plurality of slots;
adjacent chambers of the first plurality of chambers are separated by individual vanes of the plurality of vanes; and
adjacent chambers of the second plurality of chambers are separated by the individual vanes of the plurality of vanes.

18. The apparatus of claim 16, further comprising:
a first plurality of ports extending through the first rotating member; and
a second plurality of ports extending through the second rotating member.

19. The apparatus of claim 16, wherein:
the first rotating member and the second rotating member rotate about a center rod; and
the fixed member couples to the center rod.

* * * * *